3,259,561
PROCESS FOR THE CONTINUOUS MANUFACTURE OF CHLORINATED HYDROCARBONS

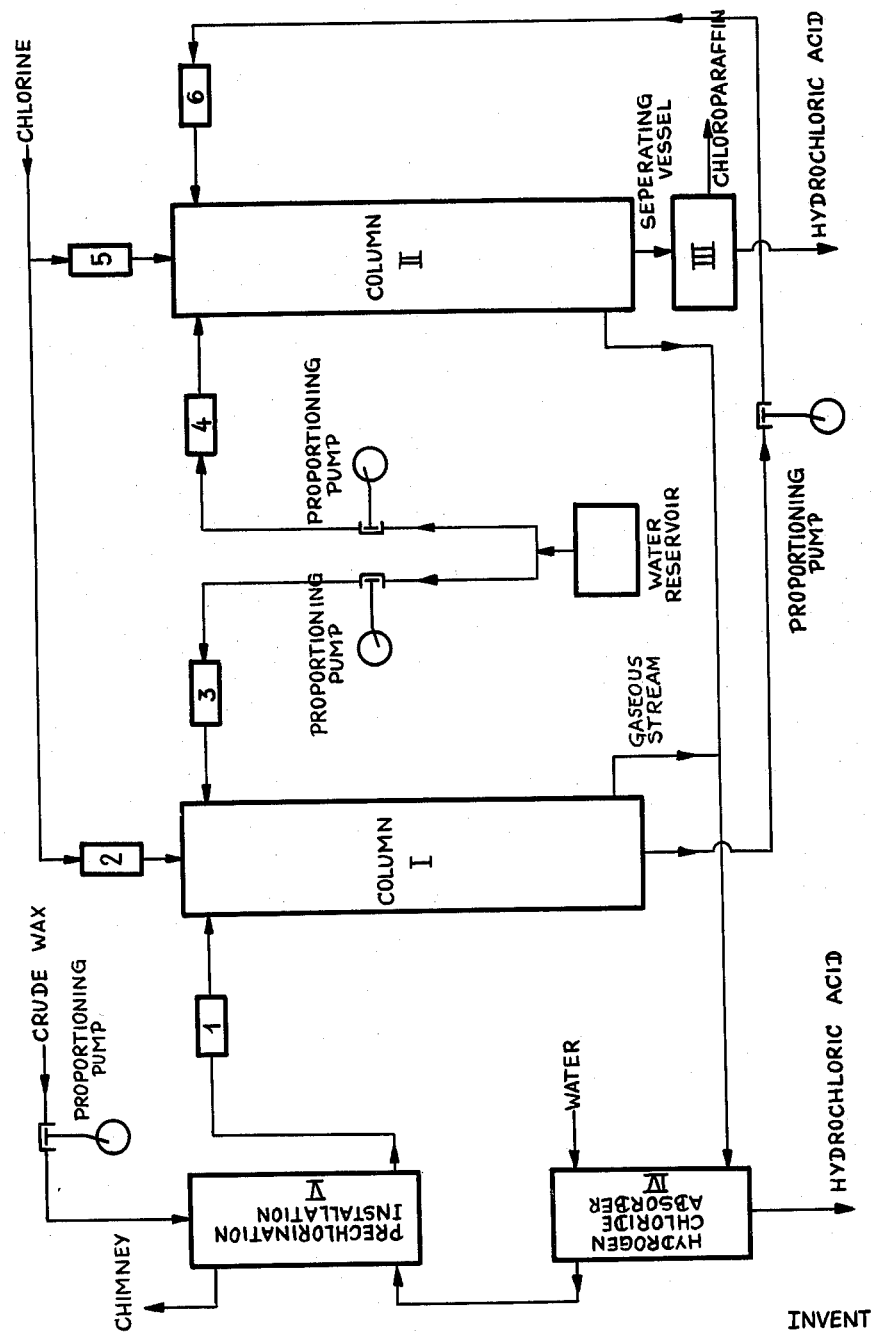

Theodor Sievers, Gersthofen, near Augsburg, Germany, assignor to Farbwerke Hoechst Aktiengesellschaft vormals Meister Lucius & Brüning, Frankfurt am Main, Germany, a corporation of Germany
Filed Oct. 4, 1963, Ser. No. 313,957
Claims priority, application Germany, Oct. 6, 1962,
F 37,987
6 Claims. (Cl. 204—163)

The present invention relates to a process for the continuous manufacture of chlorinated hydrocarbons.

The continuous manufacture of chlorinated hydrocarbons has many advantages regarding process technology because the reactants are gases and/or liquids which are especially well suited for a continuous flow of the material and, therefore, are conducive to fully utilizing the advantages of a continuous method. Another reason for preferring a continuous process, especially in the manufacture of chloroparaffins, is that as high time/space yields as possible are desired to keep small the reaction space required for the complete conversion of the chlorine. Small reaction spaces enable reaction apparatuses to be constructed of high quality construction materials under economically reasonable conditions whereby contaminations caused by the construction material which occur frequently and impair the quality of the product, for example the stability and the light color thereof, can be avoided.

However, small reaction spaces are only advantageous, especially in the case of large throughputs, when it is not necessary to discharge and recharge them after each conversion that has taken place, as is the case with discontinuous operation. The continuous manufacture of chlorinated hydrocarbons, therefore, is especially advantageous when it is possible to operate in as small reaction spaces as possible with high time/space yields.

In addition to finding a suitable construction material, the problem of finding a suitable cooling for the reaction space presents itself, especially in the case of the high time/space yields required. On the one hand, cooling must be sufficient to abstract the heat of about 360 kcal./kg. of converted chlorine, on the other hand it shall remove the heat of reaction as directly as possible from the field of reaction without heat transport through the reaction product to the cooling surface because otherwise, on account of the poor heat conductivity of the reaction product, a considerable temperature drop would result between the cooling surface and the field of reaction. It is then necessary to keep the chlorine conversion within certain limits to avoid local superheatings and destructive chlorination phenomena. Cooling, moreover, shall take place without substantial differences in temperature between cooling surface or cooling agent and the reaction space. In the case of larger temperature differences manifesting themselves necessarily, for example, when using the customary jacket- or tubular cooling (external- or internal cooling), there is formed, due to the high temperature/viscosity coefficient of higher chlorinated hydrocarbons, especially higher chlorinated paraffins, a tenacious and tough heat-insulating layer on the cooling surface which results in non-uniform chlorination with a low chlorine conversion.

For the purpose of comparison it is mentioned that in a chlorination vessel provided with internal tubular cooling about 20 kilograms of chlorine per hour/cu.m. can be converted in discontinuous operation.

When working according to known processes for the continuous production of chlorinated hydrocarbons, with a prechlorinated and recirculated product, a chlorine conversion of about 750 kg. of chlorine per hour/cu.m. is attained in which case only half of the chlorine amount added is converted. However, this increase in the chlorine conversion as compared with the discontinuous chlorination involved the drawback of having to repump larger amounts of prechlorinated product, which is uneconomical from the point of view of energetics, and apply an excess amount of chlorine in a relatively large reaction space.

Now I have found that the aforesaid difficulties can be avoided by feeding in the starting materials which have been preheated to 50 to 150° C. under a pressure above 0.1 atmosphere up to about 5 atmospheres, preferably 0.5 to 1.5 atmospheres, at the head of a packed column and simultaneously introducing water which was likewise preheated to 50° to 150° C. at the same part of the column in controlled amounts in a manner such that the column cross section is fully wetted and the heat of reaction evolved in the course of the chlorination can be immediately removed from the field of reaction by the evaporation of water. The reaction temperature is situated at 50° to 150° C., preferably at about 120° C. After the chlorination the aqueous phase is removed from the two-phase system by decanting or centrifuging and the residual amount of the water which is finely suspended in the product is removed by blowing out with chlorine and/or air.

The process of the present invention does not have the drawbacks described above. It renders possible the conversion of up to 5000 kg. of chlorine per hour/cu.m. which, even in the case of large throughputs, enables chlorination to be carried out in small reaction spaces which, on account of their small size, may consist of glass, ceramics, enamel and similar materials. In this manner, especially pure and thus more stable chlorinated hydrocarbons can be produced on an industrial scale.

The problem of the removal of heat which is of decisive importance with such a high chlorine load was solved by a direct cooling principle which is novel in this form. By evaporating water or hydrochloric acid in the reaction space, the reaction heat is eliminated from the field of its origin in which case, due to the peculiarity of said cooling principle, no differences in temperature result between the cooling agent and the material to be cooled. The evaporation heat of the water (or of the hydrochloric acid) heated to the boiling point is utilized in order to remove the heat of the reaction. Said direct evaporation cooling in the reaction space, in comparison with the indirect evaporation cooling in which the evaporating cooling agent evaporates in separated cooling aggregates and heat transports in the reaction space involving the aforesaid drawbacks cannot be avoided, has the advantage of being effective in practically any part of the reaction space.

Another advantage is that, since the cooling agent and the substance to be cooled are not miscible with one another, a reaction temperature is attained which is practically constant throughout the whole reaction space and which, under the pressure prevailing in the reaction space, is situated at the boiling point of hydrochloric acid of 21% strength. If, as cooling liquid, a liquid is used that is miscible with the reaction products, such as carbon tetrachloride, there is obtained in the reaction space a sliding temperature drop which is hardly controllable and which corresponds to the respective amount of carbon tetrachloride still being in the liquid phase.

A further advantage of the process of the present invention is that the hypochlorous acid formed in the reaction space by the direct action of elementary chlorine on water or hydrochloric acid can be used to remove contaminations of the hydrocarbon phase which impair the result of the chlorination. Metal chelates, for example, which may occur in synthetic paraffin hydrocarbons, are destroyed by the action of hypochlorous acid in which case water-soluble metal compounds are formed which collect in the aqueous phase and can be continuously removed therefrom. It is also characteristic of the novel chlorination process that a practically complete chlorine conversion is attained in spite of short residence times. Losses of chlorine which may occur when the apparatus is overloaded for a short time are avoided by a prechlorination installation, i.e. a packed tower in which the waste gas is encountered by fresh unchlorinated hydrocarbon. The chlorination process of the invention cannot only be applied in purely thermal chlorination processes but also in photochemical or mixed photochemical/thermal chlorination processes. In the photochemical chlorination an especially high quantum yield is attained in the range of about 250 to 500 m$\mu$ because the actinic light can penetrate more easily through the gas/liquid magma into the more deeply situated layers of the reaction room and is practically effective in the entire reaction space. The aqueous portion of the liquid phase in the column does not absorb portions of light within the range of from 250 to 500 m$\mu$, whereby not only losses of actinic light are avoided but a better penetration and higher activity of the actinic light is attained owing to the fine dispersion of the aqueous phase in the entire material to be reacted. Consequently, especially high chlorine conversions are obtained in the photochemical chlorination by the process according to the invention, which conversions can be fully utilized and the temperature thereof controlled owing to the efficacy of the novel cooling principle.

All hydrocarbons lend themselves to chlorination by the process of the present invention which are present in the liquid from under the reaction conditions. There may, accordingly, be used paraffin hydrocarbons, for example those containing 6 to 25 carbon atoms, such as synthetic paraffins or petroleum products which may also contain olefinically unsaturated hydrocarbons, aromatic hydrocarbons, also hydrocarbons containing alkyl radicals as side chains, such as benzene, toluene, xylene, and also cycloaliphatic hydrocarbons, such as cyclohexane, cyclopentane.

An apparatus suitable for use in carrying out the process of this invention is shown diagrammatically in the accompanying flow chart. In this apparatus hydrocarbon, chlorine and water are introduced into a reaction column I via preheaters 1, 2 and 3 in exactly controlled amounts. The liquid phase discharged at the bottom of the column is fed into a reaction column II via a preheater 6 by means of a proportioning pump. Via preheaters 4 and 5 also the reaction column II is charged with dosed amounts of chlorine and water. The liquid phase discharged from the reaction column II is separated into an aqueous phase and an oily phase in a separating vessel III. To remove the finely suspended water and the dissolved hydrogen chloride, the oily phase is conducted to a blow-out tower where it is blown out with chlorine and/or air. The gaseous phases emanating from reaction columns I and II are conveyed together through a hydrogen chloride absorber IV and then passed on to a prechlorination installation V from where the residual gases can escape into the chimney. Through the prechlorination installation V, hydrocarbon is passed in countercurrently to the residual gas, which hydrocarbon is later on introduced into the reaction column I.

In many cases it has been found to be suitable to recycle the water acting as a cooling agent and the aqueous hydrochloric acid formed via a heat exchanger. When contaminated hydrocarbons are used, the water-soluble contaminations can be removed continuously by stripping 10 to 50% by weight, calculated on the total amount of water and aqueous hydrochloric acid, of the recycled water and the aqueous hydrochloric acid. Contaminations which are insoluble in water but capable of being eliminated by water vapor must be discharged in an oil separator.

The following examples serve to illustrate the invention, but they are not intended to limit it thereto:

Example 1

The apparatus used in this example and the apparatuses used in the following Examples 2 and 3 were provided with reaction columns which had a diameter of 25 mm. each. The columns were filled with Raschig rings (4 mm.). In this experiment, the reaction columns had a length of 3 m. each. Reaction column I was charged with 3.3 kg. of crude paraffin, 3 kg. of chlorine and 7 kg. of water per hour.

Reaction column II was charged with 2.6 kg. of chlorine and 1.4 kg. of water per hour.

The reaction temperature in the columns was 114° to 120° C. and the pressure at the head of the columns 0.6 to 0.7 atmosphere. After the water had been separated, 5.84 kg. of chloroparaffins were obtained per hour which had a chlorine content of 46% and a light yellow color, which corresponds to a chlorine yield of 99% and a chlorine conversion of 1900 kg. of chlorine per hour/cu.m., calculated on the reaction space of the unpacked columns.

Example 2

In the same apparatus which had a length of 1000 mm. per column, the following results were obtained under the action of actinic light which was supplied by two fluorescent tubes (type Osram® L 100 W/70), under the same conditions as described in Example 1:

Amount of product _____ 5.8 kg./h.
Chlorine content _____ 45.2%.
Chlorine yield _____ 98%.
Chlorine conversion _____ 5200 kg. per hour/cu.m.

Reference Example (3)

In an apparatus as described in Example 1, the reaction columns were provided with an external jacket serving to remove the heat of reaction instead of the direct evaporation cooling. When this installation was operated without direct evaporation cooling but under otherwise the same conditions as described in Example 1, the contents of the columns caught fire and the product obtained was charred and had decomposed under destructive chlorination.

I claim:

1. A process for the continuous chlorination of liquid paraffin hydrocarbons containing 6–25 carbon atoms during which process high reaction heat develops, comprising the steps of separately metering in at the head of a packed column, at a temperature within the range of from 50°–150° C. and under a pressure of 0.1–5 atmospheres, said paraffin hydrocarbons, gaseous chlorine and, as cooling agent, such an amount of water that the cross section of the column is fully wet, and maintaining during the total time of reaction a temperature of 90–150° C., the reaction heat being dissipated immediately from the field of reaction through evaporation of the aqueous hydrochloric acid formed.

2. A process as claimed in claim 1 wherein actinic light is applied to the reactants during the chlorination process.

3. A process as claimed in claim 1, wherein a pressure ranging from 0.1 to 1.5 atmospheres is maintained.

4. A process as claimed in claim 1, wherein during the total time of passage a temperature of about 120° C. is maintained.

5. A process as claimed in claim 1, wherein the water acting as a cooling agent and the aqueous hydrochloric acid are recycled.

6. A process as claimed in claim 5, wherein contaminated paraffin hydrocarbons containing 6–25 carbon atoms are used and the contaminations are removed continuously by stripping 10 to 50% by weight of the water and of the aqueous hydrochloric acid which are recycled.

References Cited by the Examiner

UNITED STATES PATENTS

| | | | |
|---|---|---|---|
| 2,015,044 | 9/1935 | Teichman et al. | 260—660 |
| 2,022,619 | 11/1935 | Gallsworthy | 260—660 |
| 2,031,938 | 2/1936 | Deanesly et al. | 260—660 |
| 2,403,179 | 7/1946 | Hull et al. | 260—660 |
| 2,941,013 | 6/1960 | Jenney et al. | 260—660 |
| 2,997,508 | 8/1961 | Stretton et al. | 260—660 |

LEON ZITVER, *Primary Examiner.*

K. V. ROCKEY, *Assistant Examiner.*